United States Patent Office.

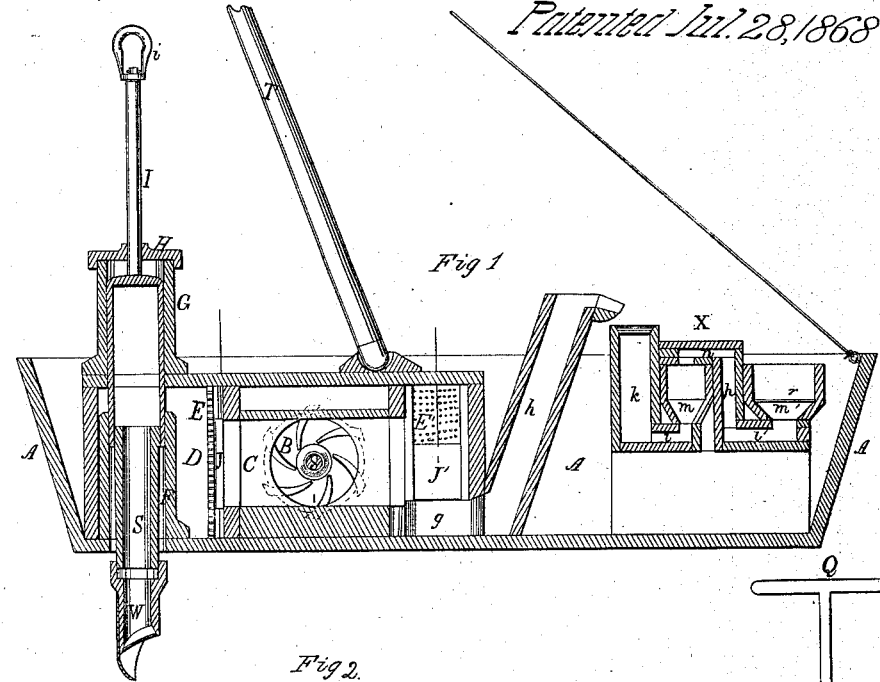

WILLIAM T. DUVALL, OF GEORGETOWN, DISTRICT OF COLUMBIA, ASSIGNOR TO THE DUVALL PATENT PUMP, DREDGING, AND GOLD-WASHING COMPANY.

*Letters Patent No. 80,398, dated July 28, 1868.*

IMPROVEMENT IN APPARATUS FOR COLLECTING AND SEPARATING MINERAL AND METALLIC SUBSTANCES.

*The Schedule referred to in these Letters Patent and making part of the same.*

TO ALL WHOM IT MAY CONCERN:

Be it known that I, WILLIAM T. DUVALL, of Georgetown, in the county of Washington, and District of Columbia, have invented certain new and useful "Improvements in Apparatus for Collecting and Separating Metallic and Mineral Substances," and for other purposes, as hereinafter set forth. This invention is an improvement on and addition to that described in the patent issued to me, October 15, 1867, and numbered 69,784, as improvement in apparatus for separating gold, &c.; and I do hereby declare that the following is a full, clear, and exact description thereof, reference being had to the accompanying drawings, making part of this specification, and in which—

Figure 1 represents a vertical longitudinal section through the centre of my apparatus.

Figure 2 is a partial plan view of the same, with the cover of the wheel-chamber removed.

Figure 3 is a detached view of a hand-instrument for exploring crevices in rocks and the like.

Figure 4 is a vertical longitudinal section of a modified arrangement of the apparatus for separating and retaining the rich deposits, elevated.

Figure 5 is a section of pipe to be used for lengthening the hollow auger.

Figure 6 is a modified form of the instrument, adapted for use in sandy beds.

Figure 7 is a vertical section of the same.

Figure 8 is an instrument to be used as a scoop or drag.

The same letters of reference occurring on the several figures indicate like parts.

The nature of my invention consists, first, in the application of the principle of exhaustion, for the purpose of raising, by atmospheric pressure and rapid currents of air or water, the solid and rich deposits often found in the beds of rivers and other streams; also, in so connecting the suction-pipe with the pump, or its supply-chamber, that it may be susceptible of vertical, oscillating, vibrating, or rotary motion, relatively to the pump whilst in operation; furthermore, in a peculiar construction of the vanes and other portions of the centrifugal pump, to adapt it to pass solid and heavy substances, and to deliver the same with ease from its periphery; also, in a novel construction or formation of the excavating-bits or tools, and modes of applying the same to suit the various circumstances under which they may be used; and in a novel arrangement and construction of passages containing mercury for the retention of the gold or other metallic deposits discharged by the pump.

This, my invention, is more particularly applicable to the recovery of gold or other metallic deposits found in the beds of streams, and as such it will here be considered and described, but it is also equally well adapted to the removal of sand-bars or other similar obstructions to navigation.

To enable others to make and use my invention, I will describe its construction and operation by referring to the drawing, in which A represents a boat or vessel of any suitable form and construction, and within which is arranged an air-tight chamber, which is divided into a series of compartments or passages, in the central one of which is arranged a rotary pump or pumps, B, which I prefer to use in pairs, B B, with a feed or supply-passage, C, between them, as in this manner all lateral pressure of the current is divided and equalized. In an adjoining compartment, D, having communication with the passage C through a strainer, E, is a cylinder, F, extending upwardly nearly to the top of said compartment D, and having open communication therewith, as also through the bottom of the vessel A. Above this cylinder, and, as it were, an extension thereof, is seated on the cover of the chamber another cylinder, G, which is open at its lower end, and closed with a cover, H, at its upper end, through the centre of which passes the rod I, the object of which will be hereinafter more fully explained.

In case it should be found desirable to apply the suction on either side of the vessel, I cut off communication between the compartment D and the passage C, by means of the sliding gate J, and open communication by the gate $J^1$ or $J^2$, with one or both of the side compartments $D^1$ or $D^2$, through which the pump is supplied by means of the pipe K, passing through the side of the vessel and so connected and supported as to admit of an oscillating motion on its horizontal portion $K^1$, on the outer end of which is hung, so as to revolve freely thereon, a spur-wheel, L, with a bevel or mitre-wheel, M, attached to rotate with it; and suspended from the horizontal pipe $K^1$, by means of the bracket N, is the pipe K, which is also capable of receiving a rotary motion on its own axis by the bevel-wheel $M^1$, fast thereon, gearing into the bevel-wheel M, which may be rotated in any convenient manner. The compartments $D^1$ and $D^2$ are also provided with strainers, $E^1$ $E^2$, between them and the pump-chamber or supply-passage C.

In case it is desirable to explore amongst cracks and crevices in a rocky bed, I attach an instrument, represented in fig. 3, by means of a flexible pipe, P, to either of the chambers D, $D^1$, or $D^2$. This instrument consists of a hollow stem, $P^1$, with a revolving collar, $P^2$, forming a universal passage, connecting it, through the branch-pipe $P^3$, with the flexible tube P, in such manner that the stem $P^1$ may be rotated by the auger-handle Q attached to its upper end, whilst the lower end of the hollow stem, being cut on a bevel, or otherwise suitably formed, may be worked into small crevices, and the rich deposits therein be readily extracted.

The centrifugal wheel here represented also involves some modifications to adapt it to the purposes of this operation. In wheels hitherto constructed, the common practice has been to enclose both sides from the periphery to about midway between that and its axis, leaving a central orifice of about half the diameter of the wheel, and at the same time to narrow the periphery to such an extent that the cross-section of the passages between the vanes should be about of equal area at all points between the axis and the periphery. This I have discovered to be erroneous, and particularly unsuitable for the purposes of this invention, which require that the discharge-orifice shall be capable of passing any solid matter admitted, and as the operation of the wheel is positively centrifugal, the course of the water admitted laterally thereto is instantly diverted in a radial direction on coming in contact with the vanes of the wheel, consequently any contraction of the discharge-orifice in a lateral direction again diverts the water from its course (at right angles to the axis of such wheel) into which it had been driven by the action of the vanes. According to my improvement, the vanes $a$ are made tapering laterally from the periphery towards the axis, where they vanish in the face of the disk $e$, this disk being keyed on the shaft S, with the vanes towards the orifice in the side of the supply-passage $c$, which orifice is of equal diameter or thereabouts with that of the disk $e$, and supplies water to the entire face of the wheel, and the tapering form of the vanes, as before described, causes them to receive the water from said orifice on varying lateral planes throughout their entire length, from every point on which it is deflected or thrown off. Consequently there can be no collision of particles in their exit. Furthermore, I extend the vanes slightly, or to about the extent of half their breadth at the periphery, beyond the periphery of the disk $e$, for the purpose of inducing a lateral as well as radial discharge of the water, after it is relieved of the direct propulsion of the vanes, thereby more equally distributing the pressure in the chamber. A pair of these wheels on the same shaft, arranged face to face with the supply-passage C, having corresponding orifices therein on either side between them, neutralize all tendency to lateral strain.

Having thus described the construction and arrangement of the several features of my invention, its operation will appear as follows:

The pumps B being set in motion by steam or other suitable power, the air is exhausted from the supply-passage C between them, and the sliding gate J being opened from the chamber D, also, the hollow excavator-tube S working in the cylinder F, is suspended by a rope attached to its swivel-link, $i$, from the derrick T, the tube S being first lengthened by attaching any requisite number of splice-pieces, V, until it reaches the bed of the stream, with the auger or scoop W at its lower end, thus forming a suction or supply-pipe to the pumps, the upper end of which forms a piston fitting closely, but free to move up or down or be rotated in the cylinder F, the upper end being guided by the cylinder G and its cover, H, so that by thus rotating, or raising and lowering this hollow suction, the deposits in the bed of the stream are agitated and drawn by the force of the current up the pipe, through the chamber D, to the pump, whence they are discharged, through the passage $g$ and pipe $h$, into a washing-apparatus, X, which is constructed and operates on the plan or principle of my gold-separator, (for which Letters Patent were granted me, bearing date, October 15, 1867,) so far as the successive enlargement of the several passages is concerned; but in that, the flow was caused in some instances to pass over the mercury in the chambers, and deposit its precious metals therein, according to bulk and specific gravity of the particles, and in others to pass through upwardly-extended tubes, with annular cups of mercury surrounding them, into which the heavier particles fell, and were retained. But, according to this improvement, I cause the entire flow to pass through the body of the mercury in the throat of the chamber or chambers. Thus the flow from the pipe $h$ is discharged into the chamber $k$, which has a horizontal passage, $l$, from its lower end, connecting it with the bottom of the funnel-shaped chamber $m$, from whence it passes over by the passage $n$, and descending pipe $p$ to the bottom of the second chamber $m^1$, which is of larger area than the preceding one. Any desired number of these chambers may be arranged in succession, each successive one being of greater area in its ingress and egress-passages. The lower horizontal passage $l^1$, of the last or of any number of them, is filled with mercury, so that the flow of water therethrough will drive the mercury forward into the funnel-shaped bottom of the next chamber $m^1$, and to prevent the flow from passing in a single column through it, I place a perforated plate, $r$, in a suitable position therein, above the elevated mercury, by which the column is divided, and caused, as it were, to percolate through it.

In case the suction or excavator-tube $S^1$ should be capable of passing particles of solid matter that could not be discharged by the pumps, it may be necessary to place a grating between the chamber D and the pumps so as to retain such particles in said chamber, but I prefer to so proportion the orifice of the pipe to the passages of the pump, that whatever can enter the former may have free course through the latter, and other portions of the apparatus.

In some kinds of material it may be necessary to use a species of drill as a substitute for the scoop-auger W, in which case I apply it to the pipe K, on either or both sides of the vessel, and communicate a continuous rotary motion thereto through the gear-wheels L M M¹, as before described. This suction may be operated either in a vertical or be dragged in an oblique position on the surface of the bed of the stream, by which the deposit will be agitated and drawn in by the current.

In figs. 6 and 7 is represented another form of gatherer to be substituted for the drill or scoop, when working on a sandy bed, which may be dragged laterally over it, or be rotated, as before described, sweeping a large surface, where there are no rocky obstructions, as the vessel is propelled in either direction. The orifice of this instrument being long and narrow, formed by inclining the sides towards each other, acts in a manner as a scoop, and by operating one of these on each side of the vessel, of sufficient length to meet, or nearly so, under its centre, and revolving them about the pipes K on either side, a breadth of more than double that of the vessel may be excavated as it travels over the bed.

For exploring, or in working in rocky beds in which are deep, narrow crevices, I use a hollow hand-auger, represented in fig. 8, connected with one of the chambers D by means of a flexible tube, which, through its universal coupling, P², may be used to bore or probe the rocks, and thus the richest deposits be readily discovered.

Having thus described my invention, what I claim as new, and desire to secure by Letters Patent, is—

1. The arrangement of the separating-chambers $m$ in such manner that the flow is caused to pass through the body of the mercury therein, and is spread or deflected by the perforated plate $r$, essentially as shown and described.

2. The application of artificial currents of air or water for the purpose of raising or removing solid matter, in the manner, and by means substantially as herein set forth.

3. A suction-pipe of a pump, so applied as to be capable of vertical, oscillating, vibrating, or rotary motion, substantially as and for the purposes specified.

4. The elongated foot-piece of the suction-pipe, substantially as represented in figs. 6 and 7, for operation as set forth.

5. The wheel B, constructed with one or more curved vanes, $a$, attached to the disk $e$, when said vanes are made tapering from the periphery of the disk, and vanishing or nearly so at its axis, as described.

6. The projection of the vanes $a$, in semicircular or other form, beyond the periphery of the disk, substantially as and for the purpose specified.

WM. T. DUVALL.

Witnesses:
    SYDNEY E. SMITH,
    W. MORRIS SMITH.